(12) United States Patent
Kilworth et al.

(10) Patent No.: US 9,196,100 B1
(45) Date of Patent: Nov. 24, 2015

(54) EQUIPMENT ARCHITECTURE FOR HIGH DEFINITION DATA

(71) Applicant: Deere & Company, Moline, IL (US)

(72) Inventors: Timothy J. Kilworth, Waverly, IA (US);
Scott Pilarczyk, Tinley Park, IL (US);
Jason D. Walter, Bettendorf, IA (US);
Tim Roszhart, Waukee, IA (US);
Gerald E. Rains, Eldridge, IA (US);
Brent A. Smith, Peosta, IA (US); Sean Mahrt, Le Claire, IA (US); James Lawrence Sachs, Johnston, IA (US);
David C. Smart, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/305,937

(22) Filed: Jun. 16, 2014

(51) Int. Cl.
*G07C 5/08* (2006.01)
*A01C 21/00* (2006.01)
*G06F 11/30* (2006.01)

(52) U.S. Cl.
CPC .............. *G07C 5/085* (2013.01); *A01C 21/005* (2013.01); *G06F 11/3089* (2013.01)

(58) Field of Classification Search
USPC .......................................................... 701/50
See application file for complete search history.

(56) References Cited

U.S. PATENT DOCUMENTS

| | | | | |
|---|---|---|---|---|
| 4,376,298 | A * | 3/1983 | Sokol et al. ....................... 701/50 |
| 5,742,915 | A * | 4/1998 | Stafford ...................... 455/456.1 |
| 6,061,617 | A * | 5/2000 | Berger et al. .................... 701/50 |
| 6,167,337 | A * | 12/2000 | Haack et al. ..................... 701/50 |
| 6,633,800 | B1 * | 10/2003 | Ward et al. ......................... 701/2 |
| 6,917,846 | B1 * | 7/2005 | Muller ........................... 700/108 |
| 8,190,335 | B2 * | 5/2012 | Vik et al. .......................... 701/50 |
| 8,190,337 | B2 * | 5/2012 | McClure et al. ................. 701/50 |
| 8,301,370 | B2 * | 10/2012 | Van Diggelen ............... 701/409 |
| 8,548,666 | B2 * | 10/2013 | Matthews ........................ 701/23 |
| 2007/0208497 | A1 * | 9/2007 | Downs et al. .................. 701/117 |
| 2009/0164067 | A1 * | 6/2009 | Whitehead et al. ............. 701/41 |
| 2011/0199229 | A1 | 8/2011 | Rieth et al. |
| 2011/0244919 | A1 * | 10/2011 | Aller et al. ................. 455/556.1 |
| 2014/0244100 | A1 * | 8/2014 | Kusuno et al. ............... 701/31.5 |

FOREIGN PATENT DOCUMENTS

| | | |
|---|---|---|
| CN | 102970367 A | 3/2013 |
| CN | 203204997 U | 9/2013 |
| WO | 2014026183 A2 | 2/2014 |

OTHER PUBLICATIONS 20-20-Seed Sense—This planter monitor device is an additional device for existing seeder / planter which connects with the machine using 37-pin connector, Retrieved Jun. 16, 2014, 3 pages.

Grayhill—CAN-bus high resolution display with USB & Ethernet port. Retrieved Jun. 16, 2014. 2 pages.

CAN-Ethernet Gateway V2—Integrating CAN & Ethernet http://www.systec-electronic.com/en/products/industrial-communication/interfaces-and-gateways/can-ethernet-gateway-v2.

SYS Tec Electronic, "Can-Ethernet Gateway V2 Extend CAN-networks via Ethernet or Internet" www.systec-electronic.com, Release Apr. 2013, 2 pages.

* cited by examiner

*Primary Examiner* — Thomas Tarcza
*Assistant Examiner* — Alex C Dunn
(74) *Attorney, Agent, or Firm* — Kelly, Holt & Christenson PLLC

(57) ABSTRACT

Sensor information is received from a set of sensors. First and second sets of machine monitoring data are generated from the sensor information. The first set of machine monitoring data is sent to a control system with a display in an operator compartment of a mobile machine. The second set of machine monitoring data is sent to a processing system that is separate from the control system.

30 Claims, 13 Drawing Sheets

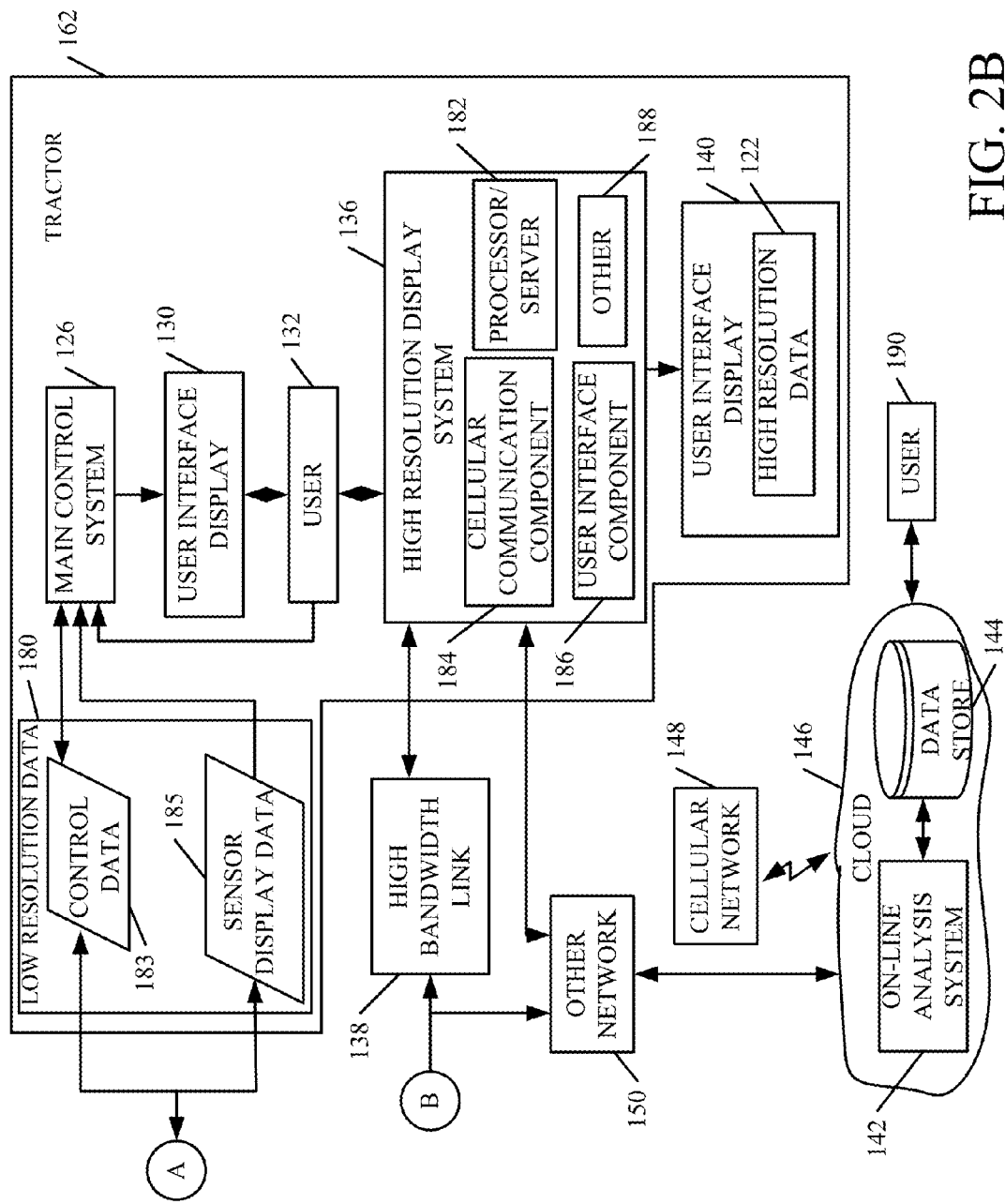

US 9,196,100 B1

EQUIPMENT ARCHITECTURE FOR HIGH DEFINITION DATA

FIELD OF THE DISCLOSURE

The present disclosure relates to equipment. More specifically, the present disclosure relates to obtaining high resolution sensor data indicative of sensed parameters.

BACKGROUND

There are many different types of equipment. Some such equipment includes agricultural equipment, such as planters, sprayers, combines, tractors, among many others. Other equipment includes construction equipment, forestry equipment, turf equipment, power system equipment, among others. Many such pieces of equipment have sensors that sense parameters and provide an output indicative of the sensed parameters. The output from the signals is often provided over a controller area network (CAN) communication bus. The sensor signals are often provided, over the communication bus, to a main control system that performs certain actions based upon the sensor signals.

For instance, the main control system can generate a user interface output (e.g., a display) such as in the operator compartment of an agricultural or other mobile machine that displays visual indicia representative of the sensor signals. It can also generate map displays that indicate how the sensor signals varied over the site (such as a field, construction site, stand of trees, etc.) that the equipment is traveling over. It can also, for example, allow the user to adjust control inputs, or other operator inputs, based upon the displayed information.

SUMMARY

Sensor information is received from a set of sensors. First and second sets of machine data are generated from the sensor information. The first set of machine data is sent to a control system with a display in an operator compartment of a mobile machine. The second set of machine data is sent to a processing system that is separate from the control system.

BRIEF DESCRIPTION OF THE DRAWINGS

FIGS. 2A and 2B (collectively FIG. 2) show a more detailed block diagram of the architecture shown in FIG. 1, deployed on an agricultural planting machine that is towed by another vehicle, such as a tractor.

DETAILED DESCRIPTION

Figure 1:
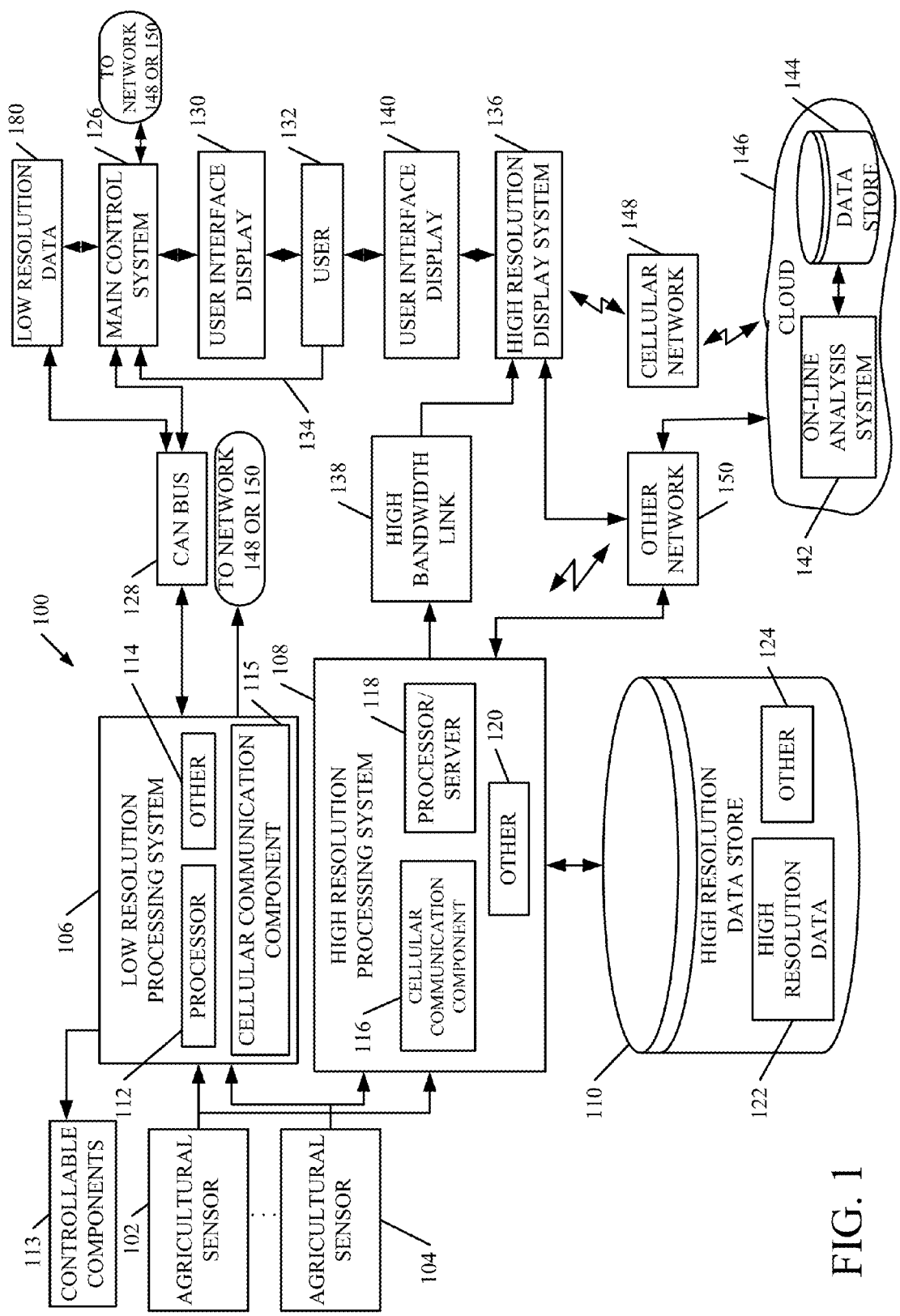
FIG. 1 is a block diagram of one example of an agricultural machine signal processing architecture.

FIG. 1 is a block diagram of one embodiment of a mobile machine signal processing architecture 100. Architecture 100 is first described in the context of an agricultural mobile machine, but it will be appreciated that it can be used in other environments as well, such as on construction equipment, forestry and turf equipment, and on other equipment.

Architecture 100 illustratively includes a plurality of different agricultural sensors 102-104 that can sense any of a wide variety of different sensed parameters on the agricultural machine on which architecture 100 is deployed. FIG. 1 also shows that architecture 100 illustratively includes a low resolution processing system 106 and a high resolution processing system 108 that, itself, is shown having access to a high resolution data store 110.

In one embodiment discussed below with respect to FIGS. 3C and 3D, systems 106 and 108 can be integrated into a single system, or high resolution processing system 108 can be used without a low resolution processing system 106. However for the sake of example, FIGS. 1-3B will first be described for an embodiment in which systems 106 and 108 are separate systems.

Low resolution processing system 106, illustratively includes a processor 112, cellular communication component (or other network communication component) 115 and it can also include one or more other components 114. High resolution processing system 108 illustratively includes a cellular communication component (or other network communication component) 116, which can be the same as component 115 or different. System 108 also includes a processor or server 118, and it can include one or more other components 120 as well. Data store 110 includes high resolution data 122 and it can include other data 124 as well.

In FIG. 1, architecture 100 shows that low resolution processing system 106 is illustratively coupled to a main control system 126 and provides low resolution data 180 over a communication bus (such as a controller area network-CAN-bus) 128. Main control system 126 illustratively generates a user interface display 130 for display and manipulation by user 132. User 132 can also provide other inputs to main control system 126, in order to control the agricultural machine or machines on which architecture 100 is deployed. This is indicated by arrow 134. FIG. 1 shows that, in one embodiment, cellular communication component 115 or main control system 126 (or another item) can provide low resolution data 180 to an on-line analysis system 142 or storage 144 in cloud 146 using a cellular network 148 or other network 150.

FIG. 1 also shows that high resolution processing system 108 is illustratively coupled to a high resolution display system 136, over a high bandwidth transmission link 138. System 136 generates a user interface display of high resolution data. System 136 can be part of system 126, or separate therefrom. Systems 126 and 136 are shown as separate for the sake of example only.

High resolution display system 136 receives high resolution data from system 108, over link 138, and generates a user interface display 140 for displaying the high resolution data to user 132. In one embodiment, high bandwidth transmission link 138 can be comprised of an Ethernet connection, another high bandwidth wired connection or a high bandwidth wireless connection, some examples of which are described in greater detail below.

FIG. 1 also shows that, in one embodiment, the high resolution data 122 (and other data) can be provided to on-line analysis system 142 where it can be stored in data store 144, for further analysis. In architecture 100, and as mentioned above, system 142 and data store 144 can be disposed in a cloud computing architecture, such as in cloud 146. The cloud computing architecture is described in greater detail below. Thus, high resolution processing system 108 can provide the high resolution data to on-line analysis system 142 using cellular communication component 116 and cellular network 148. This can also be done using another network 150. Alternatively, or in addition, high resolution display system 136 can also provide the high resolution data to on-line analysis system 142 over cellular network 148 or over other network 150.

Before providing a more detailed description of one implementation of architecture 100, an overview of the operation of architecture 100, shown in FIG. 1, will first be described. Agricultural sensors 102-104 can be any of a wide variety of different types of agricultural sensors that sense agricultural parameters on a piece of agricultural equipment. For instance, they can illustratively sense row-by-row seed placement and spacing, population, down force, skips, multiples, vacuum levels, etc. on a planter. Also, while sensors 102-104 are described as sensing items on, or characteristics of, a machine, they can sense other things as well, such as the performance or characteristics of plants, soil, pests, weeds, or a wide variety of other things that are not characteristics of the machine. They can also illustratively sense sectional ride quality, sectional down force and sectional hydraulic drives or seed meters, etc., on a planter. Additionally, they can sense such things as air temperature, soil temperature, soil moisture or other things. Of course, these are examples only, and a wide variety of other sensors can be used as well.

Low resolution processing system 106 illustratively samples the data on the sensor signals generated by sensors 102-104 at a first, relatively low resolution, sampling rate. High resolution processing system 108, on the other hand, illustratively samples the data on the sensor signals at a relatively high sampling rate, that is high relative to the sampling rate of low resolution processing system 106. By way of example only, it may be that low resolution processing system 106 samples the sensor data once per second. In that case, high resolution processing system 108 may sample the sensor data more than once per second, such as five times per second or more. In addition, low resolution processing system 106 may sample only a subset of the sensor signals. High resolution processing system 108, on the other hand, may sample all of the sensor signals. By way of example, it may be that low resolution processing system 106 only samples signals generated by a section unit, while high resolution processing system 108 performs row-by-row sensor sampling. Therefore, in one embodiment, high resolution processing system 108 is not only capable of a higher sampling rate than low resolution processing system 106, but it is also capable of sampling more sensor signals, more frequently, than low resolution processing system 106. Both systems 106 and 108 can illustratively perform signal conditioning on the sampled signals. For instance, the signals can be filtered, linearized, compensated, or otherwise conditioned. This can be done, if desired, by other components or systems as well.

The data generated by low resolution processing system 106, based upon the signals from sensors 102-104, is a first set of machine monitoring data and is referred to hereafter as low resolution data. It is illustratively provided over CAN bus 128 to main control system 126. The data generated by high resolution processing system 108 is a second set of machine monitoring data and is referred to hereafter as high resolution data. It is illustratively provided over high bandwidth link 138. High bandwidth link 138 transmits data at a higher bandwidth than CAN bus 128. In one embodiment, high resolution processing system 108 also stores the high resolution data 122 in high resolution data store 110. Therefore, if the high bandwidth link 138 is ever disrupted, high resolution processing system 108 simply stops transmitting the high resolution data to high resolution display system 136 until link 138 is reestablished. At that point, system 108 illustratively retrieves the high resolution data 122 that it has stored in data store 110 since link 138 was disrupted, and again begins transmitting the high resolution data over link 138. Also, if link 138 is sufficiently robust, then data store 110 can be a relatively small buffer memory or eliminated altogether.

Also, in one embodiment, high resolution processing system 108 illustratively includes the cellular communication component 116 that communicates over cellular network 148 (or another communication component that can communicate over network 150). In that embodiment, system 108 intermittently transmits the high resolution data 122 to on-line analysis system 142 in cloud 146. This can be done, for instance, every 30 seconds, every minute, or in longer or shorter intervals. These intervals are provided for the sake of example only.

Main control system 126 illustratively includes a computer processor that can be used to generate user interface display 130 that is indicative of the low resolution data, and that can be used to receive user inputs from user 132 in order to generate control data that is passed back through CAN bus 128 to control various controllable components 113 of the agricultural machine. System 126 can also send the low resolution data to on-line analysis system 142 in cloud 146. Therefore, even if high bandwidth link 138 is disrupted, the data indicative of the low resolution sensor signals, and the control data, can still be transmitted back and forth using CAN bus 128, and it can still be displayed to user 132 on user interface display 130, so that user 132 can continue to operate the machine.

High resolution display system 136 illustratively generates a high resolution display on user interface display 140, for user 132. The high resolution display may, for instance, include a much more fine grained display of the information indicative of the sensed parameters. This allows user 132 to obtain a more detailed view of the sensed operation of the agricultural machine. This can allow the user to make more efficient and finely tuned adjustments to the operation of the agricultural machine. Similarly, in one embodiment, high resolution display system 136, itself, includes components for communicating either over cellular network 148 or other network 150. Thus, where high resolution processing system 108 does not transmit the high resolution data to the on-line analysis system 142, high resolution display system 136 can transmit the data to system 142. It will be appreciated that both systems 108 and 136 can have the components for transmitting the high resolution data to system 142, or those components can reside on either system 108 or system 136. On-line analysis system 142 is illustratively accessible by user 132, or other users (such as farm managers, or employees at other companies, such as seed companies, fertilizer companies, agronomists, etc.). On-line analysis system 142 can perform analysis on the high and low resolution data and store the results of that analysis in data store 144, where it can be accessed by one or more of the other users. Some examples of this are described in greater detail below.

Architecture 100 can be used in a wide variety of different ways. In one example, the first set of data may be used for operating the machine or to assist the operator in operating the machine. The second set of data may be data that is not used for the operation of the machine, but may be of interest later (such as air temperature, soil temperature, etc.). In another example, the high resolution data (or a subset of it) may be used in operating the machine and may be sent to the user interface device (e.g., the display) in the operator's compartment, regardless of its resolution. These are only two examples and others can be used as well.

Figure 2A:
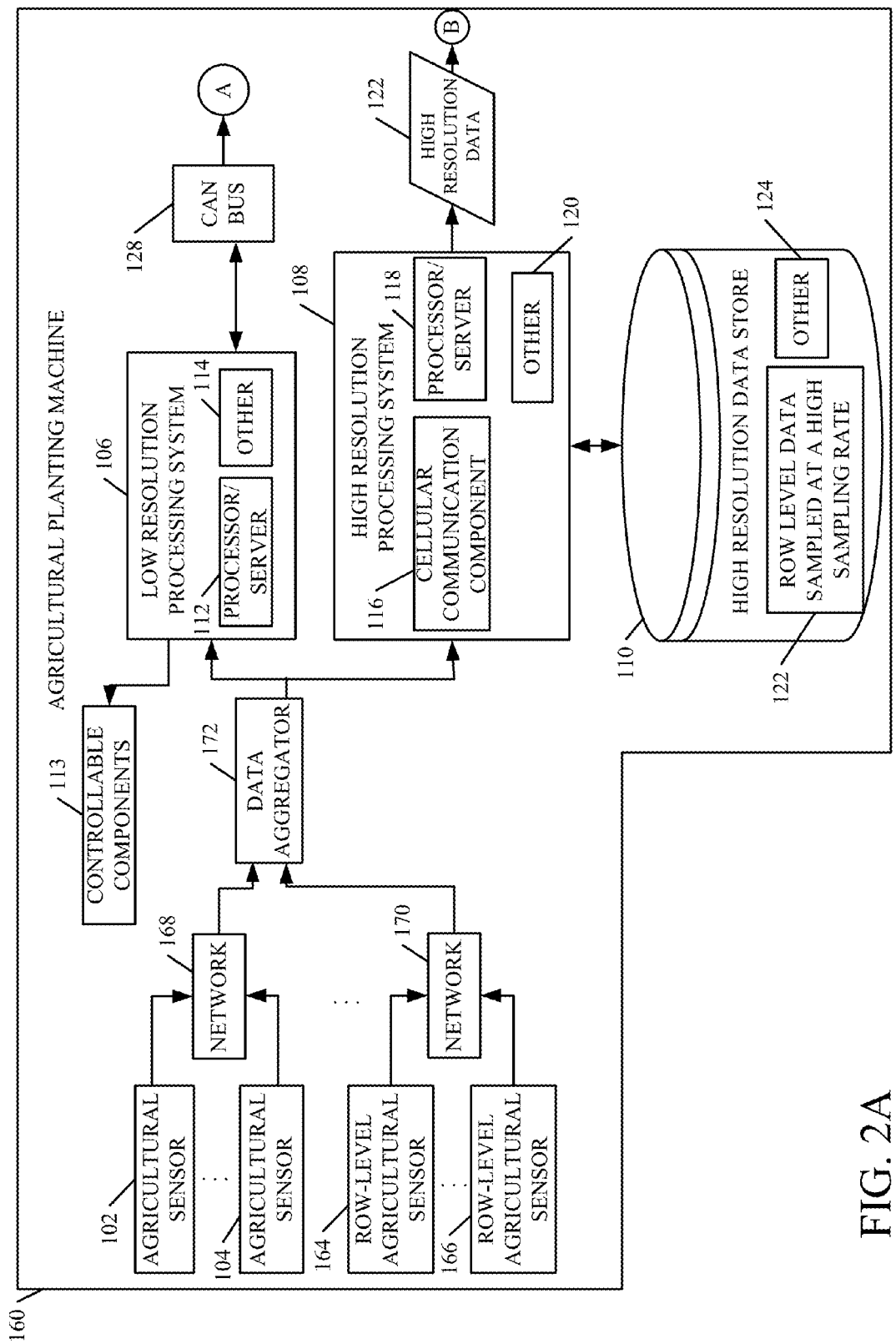

FIGS. 2A and 2B (collectively FIG. 2) show a more detailed block diagram in which the agricultural machine signal processing architecture 100 is deployed on an agricultural planting machine 160, that is pulled by a tractor 162. A number of the items shown in FIG. 2 are similar to those shown in FIG. 1, and are similarly numbered. It will, of course, be appreciated that the specific embodiment described with respect to FIG. 2 is exemplary only, and architecture 100 can be deployed on a wide variety of other agricultural machines as well.

FIG. 2 shows that, in one embodiment, architecture 100 not only includes a first set of agricultural sensors 102-104 (which are comprised of row-level agricultural sensors on planter 160), but they also include a second set of row-level agricultural sensors 164-166. By way of example, planter 160 may have two separate sensing networks 168 and 170 disposed thereon. Network 168 may receive sensor signals from sensors 102-104 which reside on a first side of the planter, while network 170 receives sensor signals from sensors 164-166, which reside on a second side of the planter. This architecture, of course, is exemplary only.

In any case, the sensor signals from the multiple networks 168 and 170 are illustratively provided to a data aggregator 172 that aggregates the sensor signals into an aggregated set of sensor signals that are provided to low and high resolution processing systems 106 and 108, respectively. Data aggregator 172 can include a low resolution data aggregator component that aggregates data for system 106 and a high resolution data aggregator component that aggregates data for system 108, or the two aggregators can be combined. High resolution processing system 108 illustratively processes the received sensor signals into high resolution data 122, that comprises row-level data sampled at a high sampling rate. It can of course include other data 124 as well. It provides the high resolution data 122 over high bandwidth link 138 to high resolution display system 136 that is illustratively deployed on tractor 162. Also, low resolution processing system 106 generates low resolution data 180 and provides low resolution data 180 (which can include control data 183 and low resolution sensor display data 185) over CAN bus 128 to main control system 126.

FIG. 2 shows some additional details, as well. For instance, FIG. 2 shows that high resolution display system 136 on tractor 162 illustratively includes a processor or server 182, a cellular communication component 184, a user interface component 186 that is used to generate user interface display 140, and it can include other components 188 as well. FIG. 2 also shows that one or more users 190 can illustratively access the high resolution data 122 through on-line analysis system 142 in cloud 146, or in other ways.

Figure 3A:
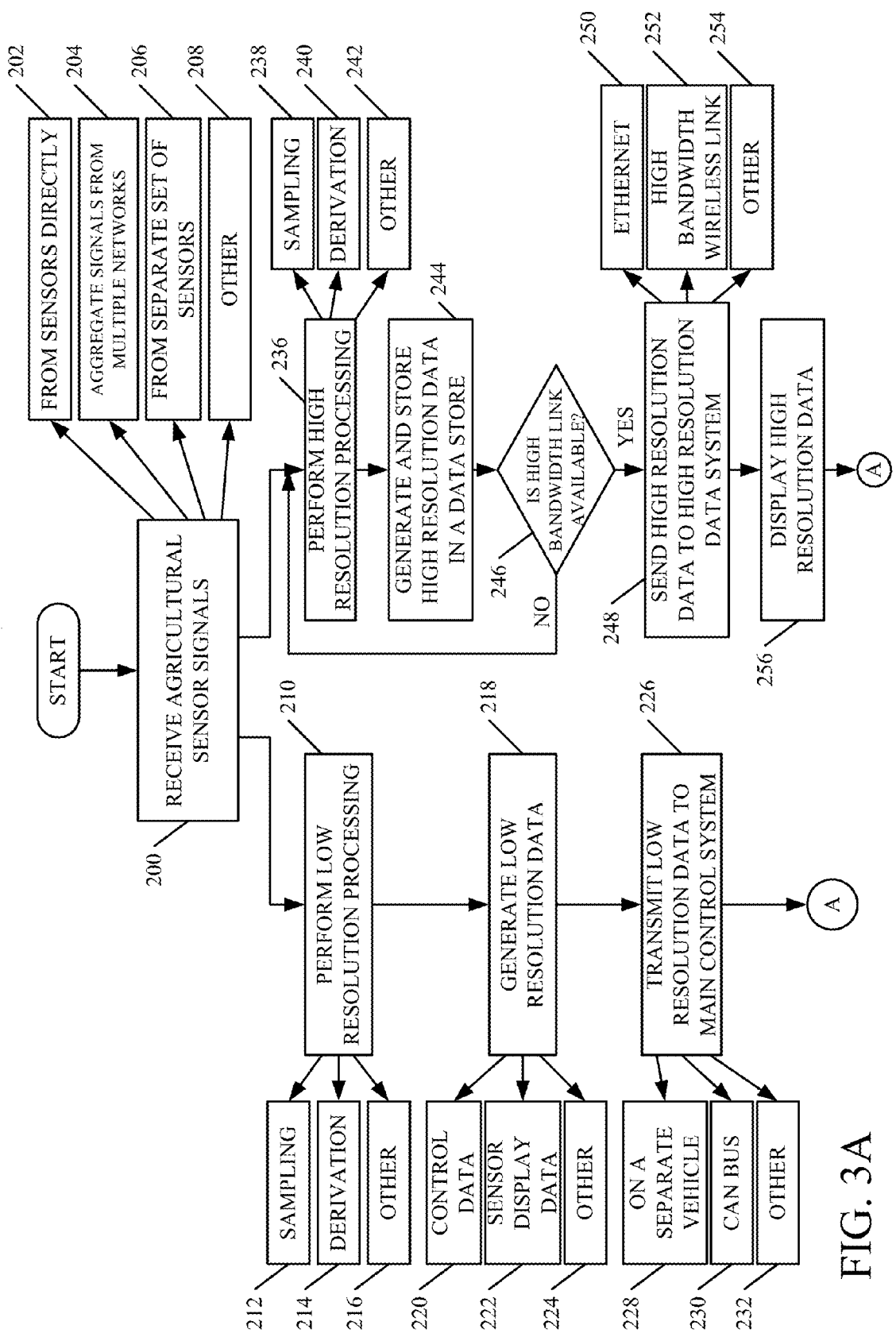
FIGS. 3A and 3B (collectively FIG. 3) show a flow diagram illustrating one embodiment of the overall operation of the architecture shown in FIGS. 1 and 2.
Figure 3B:
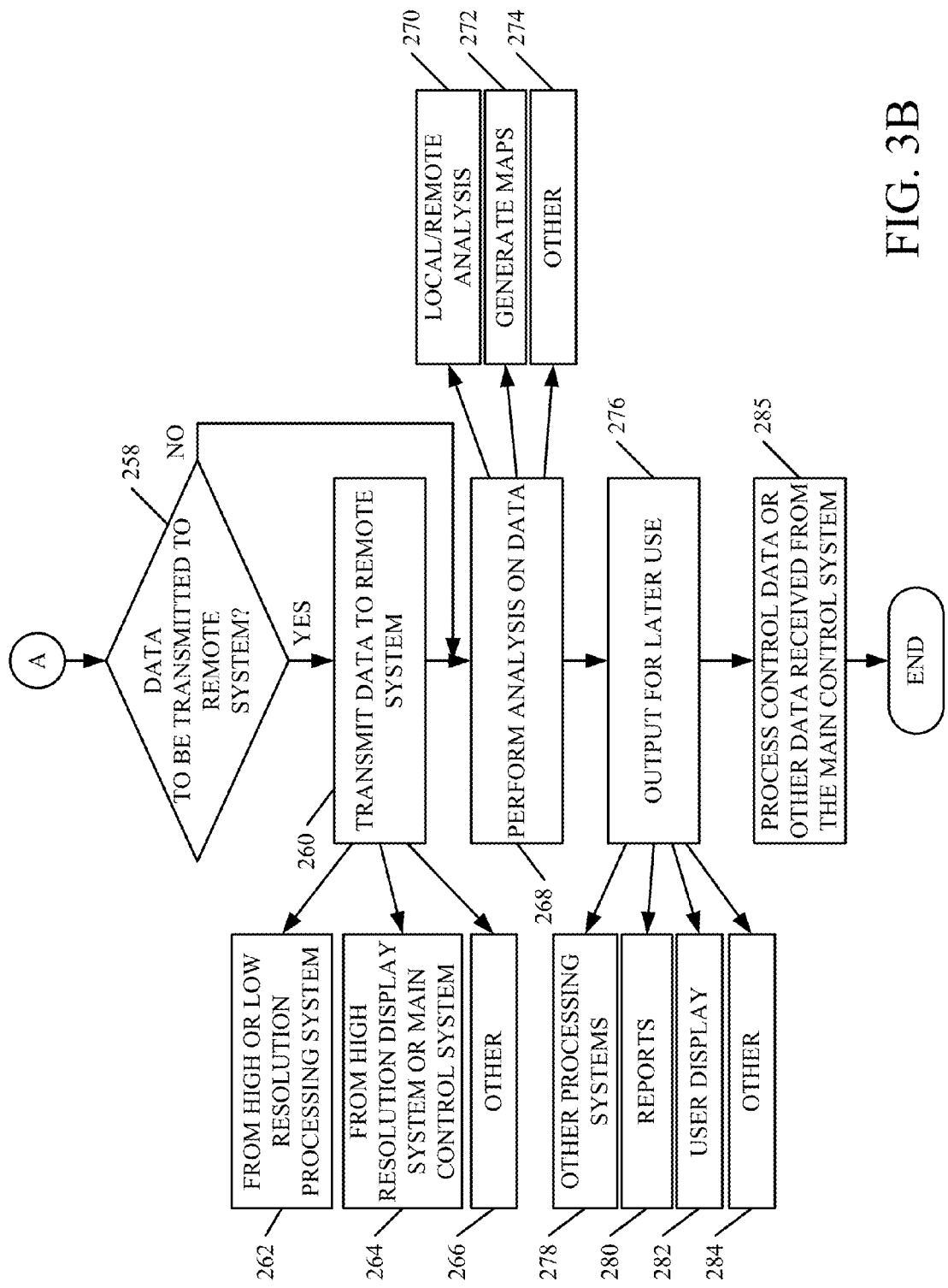

FIGS. 3A and 3B (collectively FIG. 3) show a flow diagram illustrating one embodiment of the overall operation of architecture 100, deployed on planter 160 and tractor 162. FIGS. 2 and 3 will now be described in conjunction with one another. As the user operates tractor 162 and planter 160, both the low resolution processing system 106 and high resolution processing system 108 receive the agricultural sensor signals from sensors 102-104 and 164-166. This is indicated by block 200 in FIG. 3. Of course, this can be from the sensors directly, as indicated by block 202, or from data aggregator 172 that aggregates the sensing signals from multiple networks 168-170. This is indicated by block 204 in FIG. 3. It will also be noted that, in an alternate embodiment, high resolution processing system 108 does not use the already-existing agricultural sensors. Instead, it has its own, separate set of sensors for providing the high resolution sensor data. This is indicated by block 206 in FIG. 3. In another embodiment, only one set of sensors is used for both systems. Systems 106 and 108 can receive the sensor signals in other ways as well, and this is indicated by block 208.

Once the sensor signals are received by systems 106 and 108, processing illustratively occurs along two parallel paths (although it can be sequential as well). The processing of the low resolution data is indicated on the left hand side of FIG. 3, while the processing of the high resolution data is shown on the right hand side of FIG. 3. The low resolution processing will be described first.

Low resolution processing system 106 illustratively performs low resolution processing on the received sensor signals. This is indicated by block 210 in FIG. 3. This can include, for instance, sampling at a first sampling rate as indicated by block 212, performing conditioning (such as filtering) or other derivation operations to derive low resolution data from the sensor signals, as indicated by block 214. It can also perform other low resolution processing, as indicated by block 216. In any case, low resolution processing system 106 generates the low resolution data 180. This is indicated by block 218 in FIG. 3.

The low resolution data can include a wide variety of different types of data. For instance, it can include control data 183 that is used by main control system 126 in order to control various controllable components 13 or operations of planter 160 or tractor 162, or both. This is indicated by block 220 in FIG. 3. It can include the low resolution sensor display data 185 that is displayed by main control system 126 on user interface display 130 so that user 132 can provide user inputs to perform control operations to control planter 160 or tractor 162, or both. This is indicated by block 222 in FIG. 3. The low resolution data can include other items of data as well, and this is indicated by block 224.

Low resolution processing system 106 then transmits the low resolution data 180 to main control system 126. This is indicated by block 226 in FIG. 3. As shown in FIG. 2, the main control system 126 can reside on a different machine (such as the tractor 162) from where the low resolution data was generated (such as the planter 160). This is indicated by block 228 in FIG. 3. It can be sent over a CAN bus as indicated by block 230, or it can be sent in other ways, as indicated by block 232.

Before continuing with the description of processing the low resolution data, the processing of high resolution data will first be described. After the sensor signal inputs are received at high resolution processing system 108 (either from the sensors themselves or from a data aggregator 172 or otherwise) system 108 performs high resolution processing on the received signals. This is indicated by block 236 in FIG. 3. This illustratively includes sampling the data in the signals at a relatively high rate (at a higher rate than the signals are sampled in the low resolution processing channel). Sampling is indicated by block 238 in FIG. 3.

The data is then illustratively conditioned, such as by performing filtering, linearization, compensation, or other operations. Deriving the high resolution data is indicated by block 240 in FIG. 3. High resolution processing system 108 can perform other processing steps as well, and this is indicated by block 242.

After system 108 generates the high resolution data, system 108 stores the high resolution data in high resolution data store 110. This is indicated by block 244 in FIG. 3.

Once the data is stored in high resolution data store 110 (or while it is being stored) high resolution processing system 108 illustratively determines whether high bandwidth link 138 is available for transmitting data. This is indicated by block 246 in FIG. 3. If not, system 108 simply continues to process the received sensor signals to obtain additional high resolution data, which is stored in data store 110. However, if, at block 246, it is determined that high bandwidth transmission link 138 is available, then system 108 sends the high resolution data to high resolution display system 136 on tractor 162. This is indicated by block 248 in FIG. 3. Again, the high resolution data can be sent over substantially any high bandwidth transmission link 138. This can include an Ethernet link as indicated by block 250. It can include a high bandwidth wireless link as indicated by block 252, a high bandwidth near field communication link, or it can include other high bandwidth links as indicated by block 254 in FIG. 3.

High resolution display system 136 can be substantially any system that can receive data over high bandwidth link 138 and display it on a user interface display. In one embodiment, for instance, high resolution display system 136 illustratively includes a processor or server 182 that receives and stores the high resolution data. High resolution display system 136 can illustratively be a tablet computer that is either mounted in the operator's compartment of tractor 162, or otherwise carried and accessible by user 132. In that case, the processor or server 182 is the processor in the tablet computer and controls user interface component 186 to generate user interface display 140, including high resolution data 122, on the display device of the tablet computer.

Also, while high resolution display system 136 is shown in FIGS. 1 and 2 as being a separate system from main control system 126 and user interface display 130, that need not be the case. Instead, the high and low resolution displays can be integrated so they are shown on the same display device. Also, the two different displays can be generated for two different displays devices, but they can be generated by the same system. Systems 126 and 136 can be integrated in other ways as well.

In another embodiment, high resolution display system 136 can include a separate processor or server that is mounted within tractor 162. It can have its own user interface display device for displaying user interface display 140. Alternatively, or in addition, system 136 can include not only the separate processor or server mounted within tractor 162, but it can include a data link connection (such as a USB connection) that user 132 can use to plug in a mobile device (such as a tablet computer or smart phone). It will thus be appreciated that high resolution display system 136 can take a wide variety of different forms. It can be a self-contained unit within the operator compartment of tractor 162, it can be integrated with system 126 and display 130, it can be a processor or server in the operator compartment of tractor 162 that can be connected to a user's mobile device, it can have its own display device for displaying the user interface displays, or it can generate information to support those displays on the display screen of the user's mobile device, or it can be configured in other ways as well. In any case, displaying the high resolution data for user viewing is indicated by block 256 in the flow diagram of FIG. 3.

At some point in the processing of the data, it is determined whether the data (either the high or low resolution data, or both) is to be transmitted to a remote system (such as the cloud-based on-line analysis system 142 in cloud 146). This is indicated by block 258 in FIG. 3. If it is to be transmitted to system 142, then the data is transmitted to the remote system 142, as indicated by block 260. As briefly described above with respect to FIG. 1, the data can illustratively be transmitted from high resolution processing system 108 or low resolution processing system 106 (or both) on planter 160, as indicated by block 262 in FIG. 3. It can also illustratively be transmitted to the remote system 142 by high resolution display system 136 or main control system 126 on tractor 162, or both. This is indicated by block 264 in FIG. 3. It can be transmitted from other locations within architecture 100, or in other ways as well, and this is indicated by block 266.

By way of one example, it may be that the data is stored on a user's mobile device from system 136 in tractor 162. The user can then take the data to another location (such as to the user's home or office computer) and download the data onto a desktop or transmit it to a remote server.

In any case, and in one embodiment, regardless of whether it is transmitted to a remote system, analysis is illustratively performed on the data. This is indicated by block 268 in FIG. 3. For instance, it can be performed locally on any of the embodiments of main control system 126 or high resolution display system 136, or it can be performed using low resolution processing system 106 or high resolution processing system 108. Alternatively, it can be performed by a remote system such as on-line analysis system 142 or another remote system. Performing local or remote analysis on the data is indicated by block 270 in the flow diagram of FIG. 3.

The analysis can also take a wide variety of different forms. For instance, the analysis can include generating high resolution maps using geographical information that is received by another system in architecture 100. Architecture 100 may, by way of example, include a global positioning system (GPS) that geographically tags the high resolution data to indicate the geographic location where it was obtained by the agricultural sensors. Generating high resolution maps using the high resolution data and corresponding geographical information is indicated by block 272 in FIG. 3. Of course, the analysis can include a wide variety of other analysis steps as well, and this is indicated by block 274.

Once the high resolution data is analyzed, it can be saved or output for later use. This is indicated by block 276 in FIG. 3. For instance, it can be output to other processing systems that use the information to perform further analysis (such as to correlate it to yield data, weather conditions, planting data such as fertilizer rates, hybrid data, soil type data, or other information). These are only examples of additional processing systems. Outputting the information to other processing systems is indicated by block 278 in FIG. 3.

It can also be used to generate a wide variety of different types of reports. This is indicated by block 280. It can be stored and output for later display by one or more users, as indicated by block 282, or it can be output for other reasons as well, as indicated by block 284.

Processing then proceeds to block 285 where low resolution processing system 106 processes any data received back from main control system 126. For instance, where user 132 provides control inputs to main control system 126, system 126 may provide control signals back through CAN bus 128 to low resolution processing system 106 where they are used to control various functions or mechanisms on planter 160. The control signals can be automatically generated by system 126 as well.

It can thus be seen that, in one embodiment, the various sensor signals or other information that may be used by user 132 in order to perform control operations for controlling tractor 162 and planter 160 can illustratively be provided over bus 128. The high resolution data 122, on the other hand, may not be needed by user 132 in order to perform control operations. It can illustratively be provided over a high bandwidth link 138 to high resolution display system 136, a remote analysis system 142, or to both. In this way, even if the high bandwidth link 138 is interrupted, operator 132 still has access to (and can input) the various low resolution data that is used to perform control operations for tractor 162 and planter 160. However, because the high resolution data is not lost when link 138 is interrupted (that is, it is stored in high resolution data store 110 on planter 160) it can be transmitted later to display system 136 or remote analysis system 142, or both. Therefore, the operator 132 is not interrupted in operating tractor 162 and planter 160, even if the high resolution data is temporarily unavailable (such as because link 138 is interrupted or otherwise).

Figure 3C:
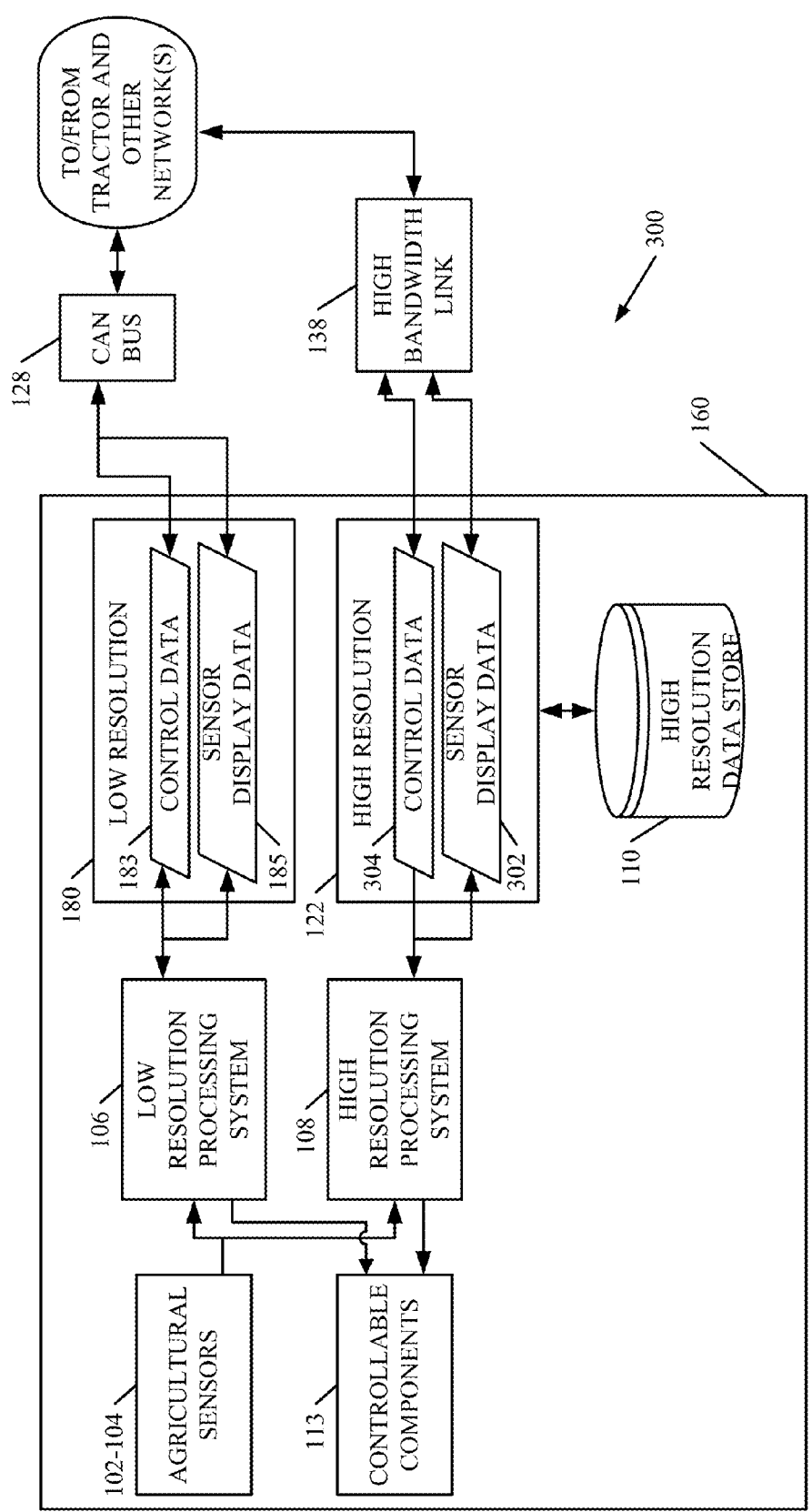
FIGS. 3C and 3D are block diagrams of additional embodiments of an agricultural machine signal processing architecture.

FIG. 3C shows another embodiment of an architecture 300 on agricultural planting machine 160. Some items are similar to those shown in architecture 100 described above with respect to FIGS. 1-3B, and similar items are similarly numbered. Also, as with architecture 100, architecture 300 can be implemented on any agricultural machine, and the planting machine 160 is described for the sake of example only. FIG. 3C shows that, in one embodiment, high resolution processing system 108 can also be coupled to controllable elements 113. Therefore, high resolution data 122 can include high resolution sensor display data 302 for generating a high resolution display and for high resolution mapping and the other things mentioned above. High resolution data 304 can also include control data 304. Control data 304 can be generated by main control system 126 on tractor 162, or by high resolution processing system 108, itself, or by another system, based on the sensor signals. It can be transmitted between tractor 162 and planter 160 over high bandwidth transmission link 138.

Control data 304 can be used to control controllable components 113 on planting machine 160, or items on tractor 162, or other items. It can be high resolution control data that provides control signals to control items more quickly or at a higher frequency than low resolution control data 183. For instance, it can respond to changes in the sensor signals more quickly and spawn more fine grained control signals than the low resolution control data 183.

In another embodiment, high resolution control data 304 can generate more control signals for controlling controllable components 113 in smaller units than low resolution control data 183. It may be, for instance, that high resolution control data 304 can be used to control the controllable components 113 individually, instead of in groups. By way of example, it can control individual row units on planter 160, independently of one another, instead of section units.

In another embodiment, control data 304 can include both high and low resolution components. The low resolution control data can be used to perform some, more gross, control operations while the high resolution control data can be used to perform other, finer, operations. In yet another embodiment, control data 304 can include only low resolution control data. In that case, the low resolution control data can be transmitted using the high bandwidth transmission link 138.

Figure 3D:
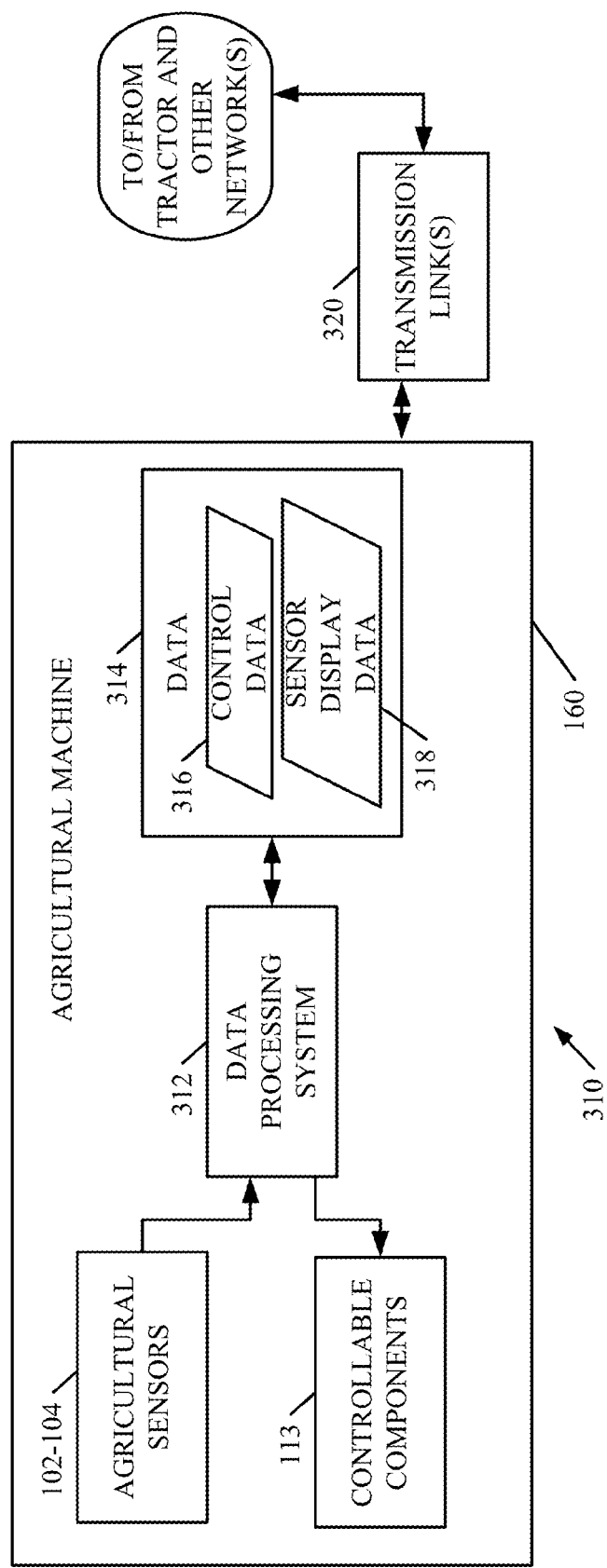

FIG. 3D shows yet another embodiment of an architecture 310 disposed on agricultural machine 160. Some items are similar to those shown in architecture 100 described above with respect to FIGS. 1-3B, and similar items are similarly numbered. Also, as with architecture 100, architecture 300 can be implemented on any agricultural machine, and the machine 160 is described for the sake of example only.

FIG. 3D shows that, instead of having two separate high and low resolution processing systems 106 and 108, there may be only a single data processing system 312. In one embodiment, system 312 combines both the high and low resolution data processing performed by systems 106 and 108, as described above, into a single, integrated system. Thus, data 314 (control data 316 and sensor display data 318) can include all of the high and low resolution data described above, but it is generated and transmitted using the single, integrated processing system 312. In such an embodiment, transmission link 320 can be the high bandwidth transmission link 138 and CAN bus 128, or only high bandwidth transmission link 138, that is used to transmit both the high and low resolution components of data 314.

In another embodiment, data processing system 312 is only a high resolution processing system that combines both the display and control functionality. For instance, the sensor display data and the control data can all be high resolution data.

In yet another embodiment, system 312 can be a variable resolution processing system. In such an embodiment, system 312 processes data at a high resolution, where the data is available at that resolution. It processes data at a lower resolution, where the data is only available at the lower resolution.

Also, with a relatively robust high bandwidth transmission link 138, the data store 110 on planter 160 can be eliminated or reduced in size to a relatively small buffer memory. All of these architectures are contemplated herein.

It will also be appreciated that architectures 100, 300 and 310 can be deployed on other systems. For instance, where the agricultural machine is a sprayer, agricultural sensors 102-104 (or additional sensors) may sense or otherwise measure the nozzle-specific delivery rate (e.g., spray pressure and flow rate) of a sprayed chemical. They can sense operation performance of liquid hydraulic pumps. They may measure other things as well, such as the height of the individual nozzles above the crop or terrain, such as height or change in position of a boom that supports the spray nozzles or other parameters. When high resolution processing system 108 is provided, the sensors can provide relatively high resolution data for individual nozzles, at a relatively high sampling rate, in order to obtain discrete nozzle-level control and data collection. Further, plant size and location can be sensed, such as by using cameras, and nozzle spray uniformity can be sensed and controlled. Also, weather conditions can be sensed using an on-board weather station with appropriate sensors. This is but one example of another implementation of architecture 100. Others can be used as well.

Where the agricultural machine is a harvester (such as a combine or other harvester), the system can monitor or sense plant spacing, header impacts with the ground or rocks (e.g., using vibration or acoustic sensors and flexible draper header angle) and performance parameters. For instance, control system response time can be sensed. Further, power consumption and efficiency data can be sensed. Also, operational characteristics of the head, and individual components of the head, can be sensed or controlled.

Where the agricultural machine is a tillage or fertilizer machine, a variety of other things can be sensed as well. For instance, residue distribution before and after tillage can be sensed. Tillage depth can be sensed and correlated to the farmer's ability to follow land contour. Soil distribution after tillage can be sensed. Tillage implement actuator (e.g., cylinder) pressures can be sensed or controlled. Also, performance and health information can be sensed, such as hydraulic pump or electric drive power consumed or output to drive various members, such as stalk choppers, rotary tillers, etc.

Where the mobile machine is a grader, various things can be sensed to obtain high resolution grade control. Where the mobile machine is a tree harvester, the sensors can sense tree stem characteristics in cut-to-length forestry operations.

These are examples only. The present discussion applies to other environments and mobile machines as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can include video images captured from cameras. They can also take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The present discussion has also mentioned remote server (or cloud) computing. Remote server computing provides computation, software, data access, and storage services that do not require end-user knowledge of the physical location or configuration of the system that delivers the services. In various embodiments, remote server computing delivers the services over a wide area network, such as the internet, using appropriate protocols. For instance, remote server computing providers deliver applications over a wide area network and they can be accessed through a web browser or any other computing component. Software or components of architecture 100 as well as the corresponding data, can be stored on servers at a remote location. The computing resources in a remote server computing environment can be consolidated at a remote data center location or they can be dispersed. Remote server computing infrastructures can deliver services through shared data centers, even though they appear as a single point of access for the user. Thus, the components and functions described herein can be provided from a service provider at a remote location using a remote server computing architecture. Alternatively, they can be provided from a conventional server, or they can be installed on client devices directly, or in other ways.

The description is intended to include both public remote server computing and private remote server computing. Remote server computing (both public and private) provides substantially seamless pooling of resources, as well as a reduced need to manage and configure underlying hardware infrastructure.

A public remote server environment is managed by a vendor and may support multiple consumers using the same infrastructure. A private remote server may be managed by the organization itself and the infrastructure is typically not shared with other organizations. The organization still maintains the hardware to some extent, such as installations and repairs, etc.

It will also be noted that architecture 100, or portions of it, can be disposed on a wide variety of different devices. Some of those devices include servers, desktop computers, laptop computers, tablet computers, or other mobile devices, handheld such as computers, cell phones, smart phones, multimedia players, personal digital assistants, etc.

Figure 4:
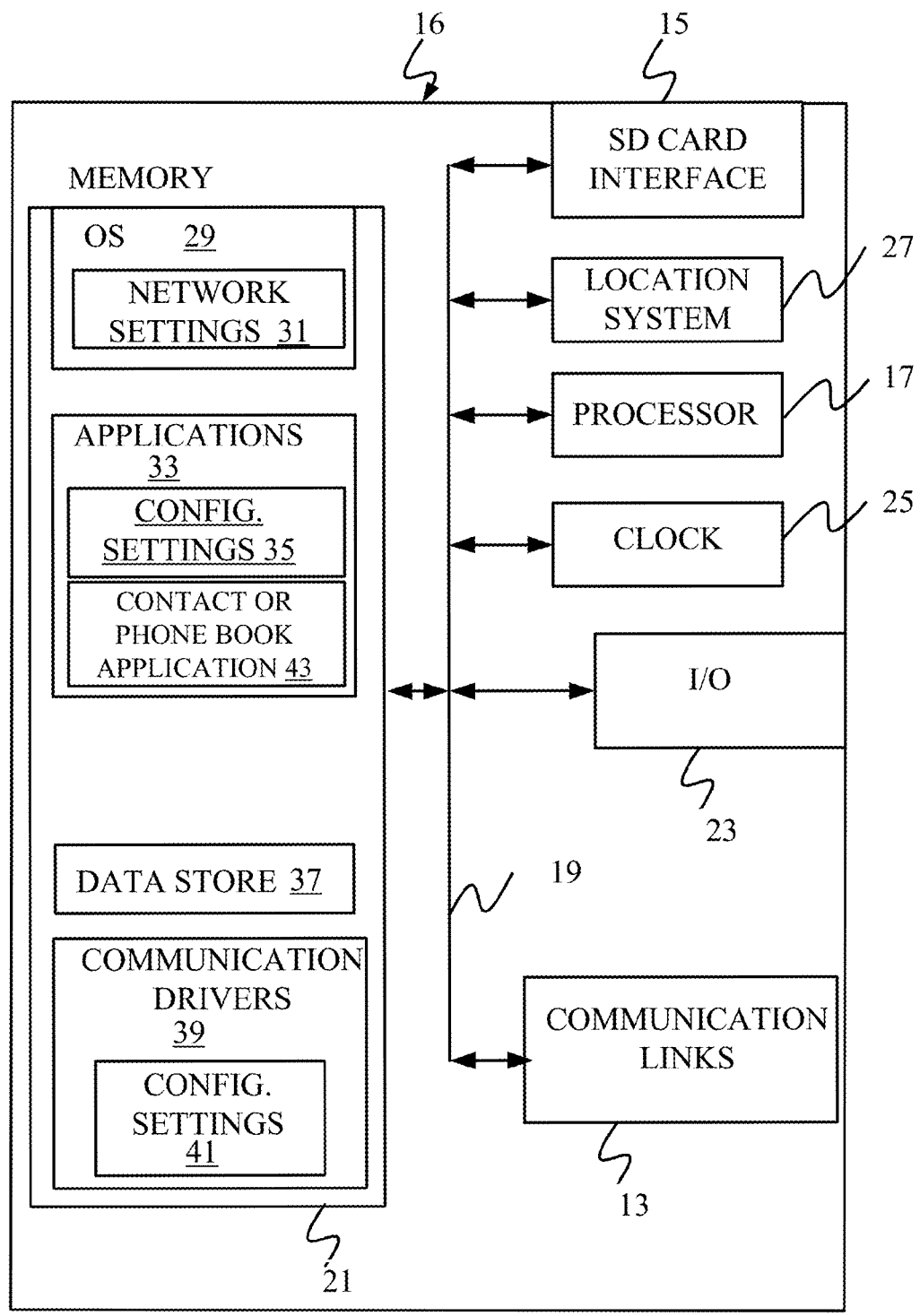
FIG. 4 is a block diagram of one embodiment of a mobile device.

FIG. 4 is a simplified block diagram of one illustrative embodiment of a handheld or mobile computing device that can be used as a user's or client's hand held device 16, in which the present system (or parts of it) can be deployed. FIGS. 5-8 are examples of handheld or mobile devices. These devices can be embedded on the agricultural machine, or separate therefrom. They can also be disconnectably coupled thereto by the operator, or they can be separated and coupled to communicate with systems on the agricultural machine. Architecture 100 can also include security mechanisms, such as encryption algorithms, secure authentication systems, etc.

FIG. 4 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11 a/b/g/n (Wi-Fi) protocols and other variations, as well as, Bluetooth and similar protocols, which provide local wireless connections to networks.

Under other embodiments, applications or systems are received on a removable Secure Digital (SD) card that is connected to a SD card interface 15 or on other removable media. SD card interface 15 and communication links 13 communicate with a processor 17 (which can also embody one or more of the processors from FIGS. 1 and 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, (such as a camera or other image capturing mechanism, a bar code scanner, etc.) voice sensors, touch screens, proximity sensors, microphones, tilt sensors, and accelerometers and output components such as a display device, a speaker, and or a printer port. Device 16 can use near field communication or other communication to connect to other I/O devices (such as a keyboard, mouse, etc.) Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global navigation satellite system (GNSS) (such as a global positioning system (GPS) or GLONASS) receiver, a LORAN system, a dead reckoning system, a compass, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 5:
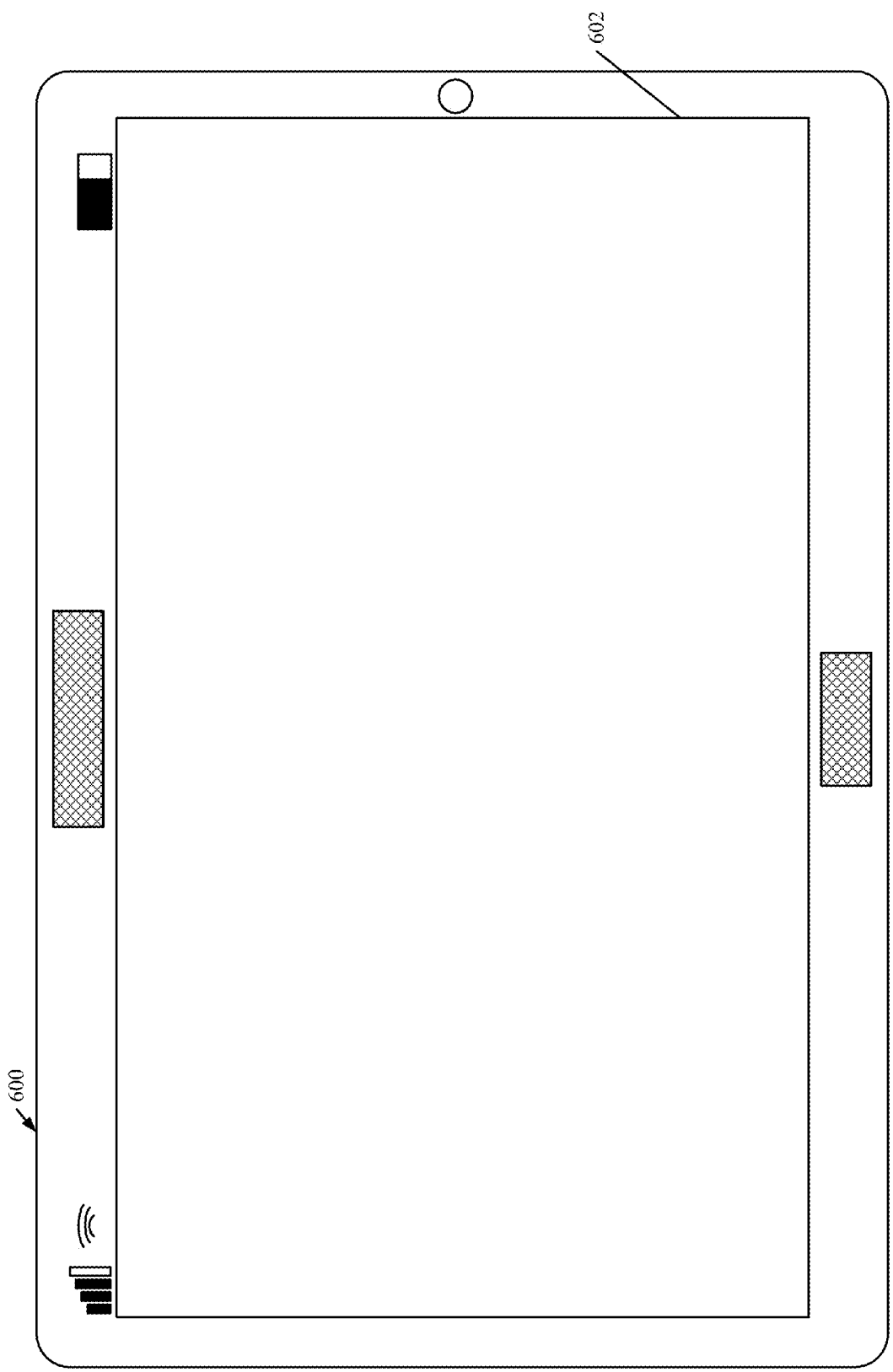
FIGS. 5-8 show various embodiments of mobile devices.

FIG. 5 shows one embodiment in which device 16 is a tablet computer 600. In FIG. 5, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 6:
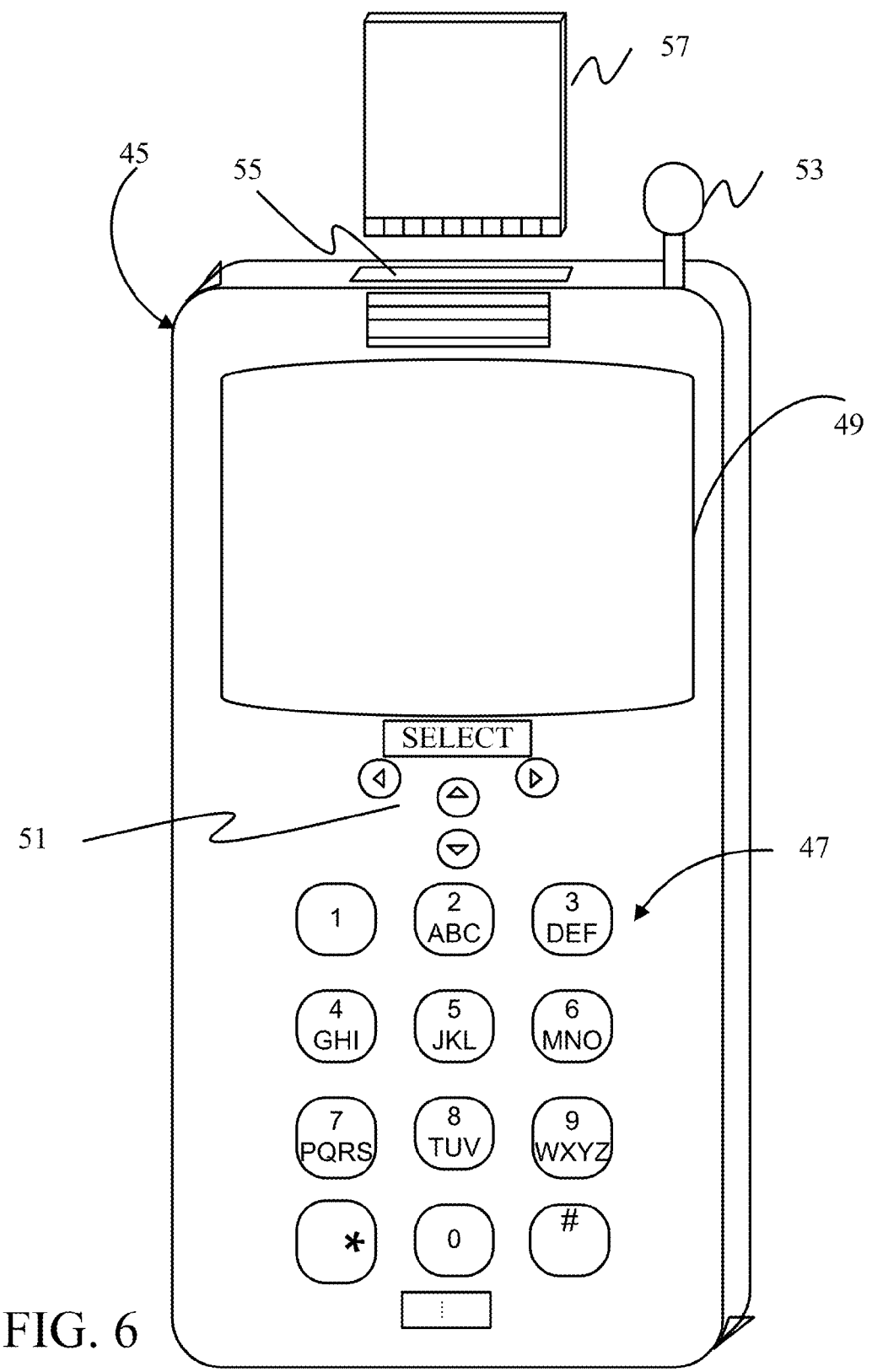
Figure 7:
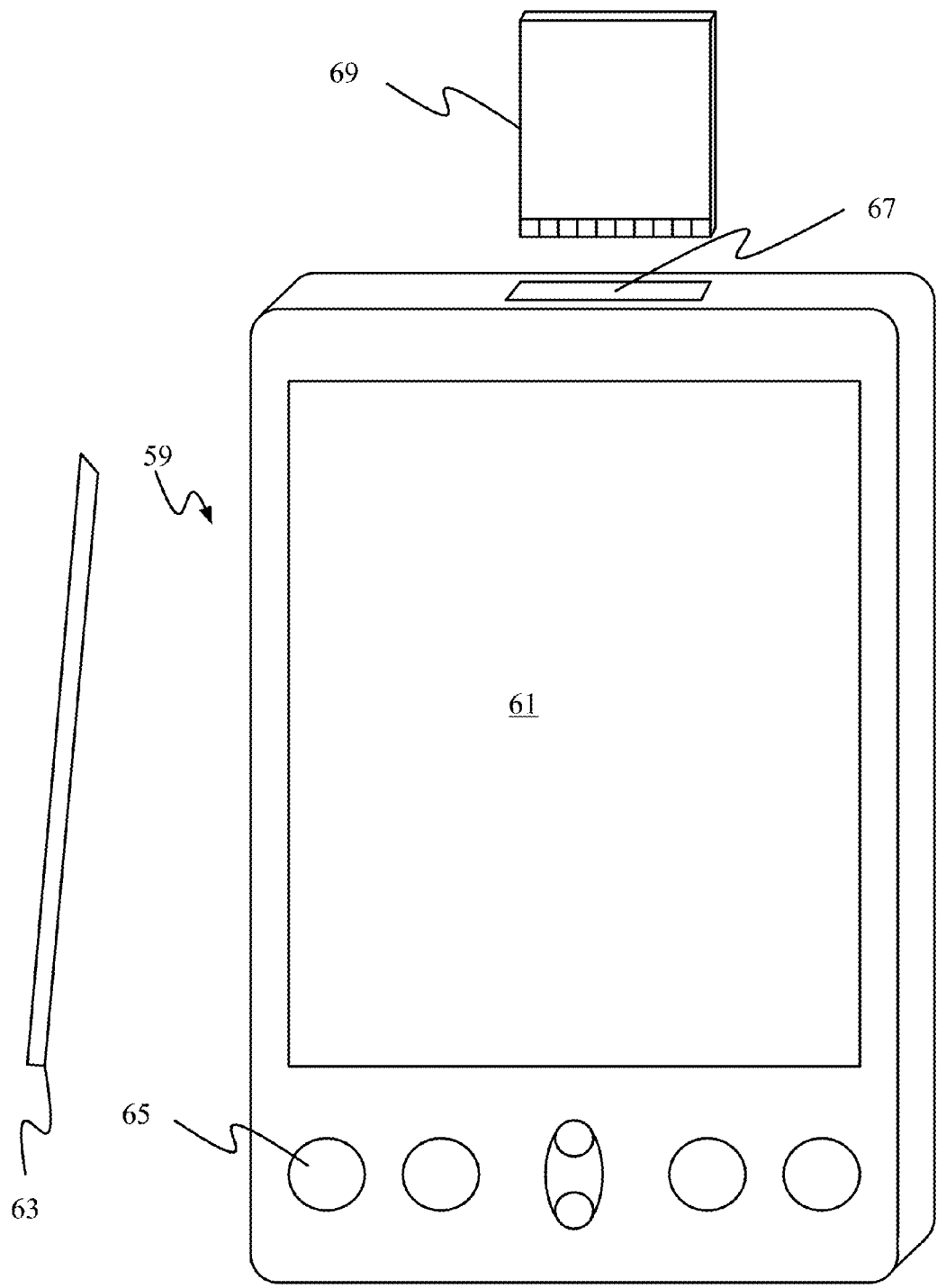

FIGS. 6 and 7 provide additional examples of devices 16 that can be used, although others can be used as well. In FIG. 6, a feature phone, smart phone or mobile phone 45 is provided as the device 16. Phone 45 includes a set of keypads 47 for dialing phone numbers and data entry, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

Figure 8:
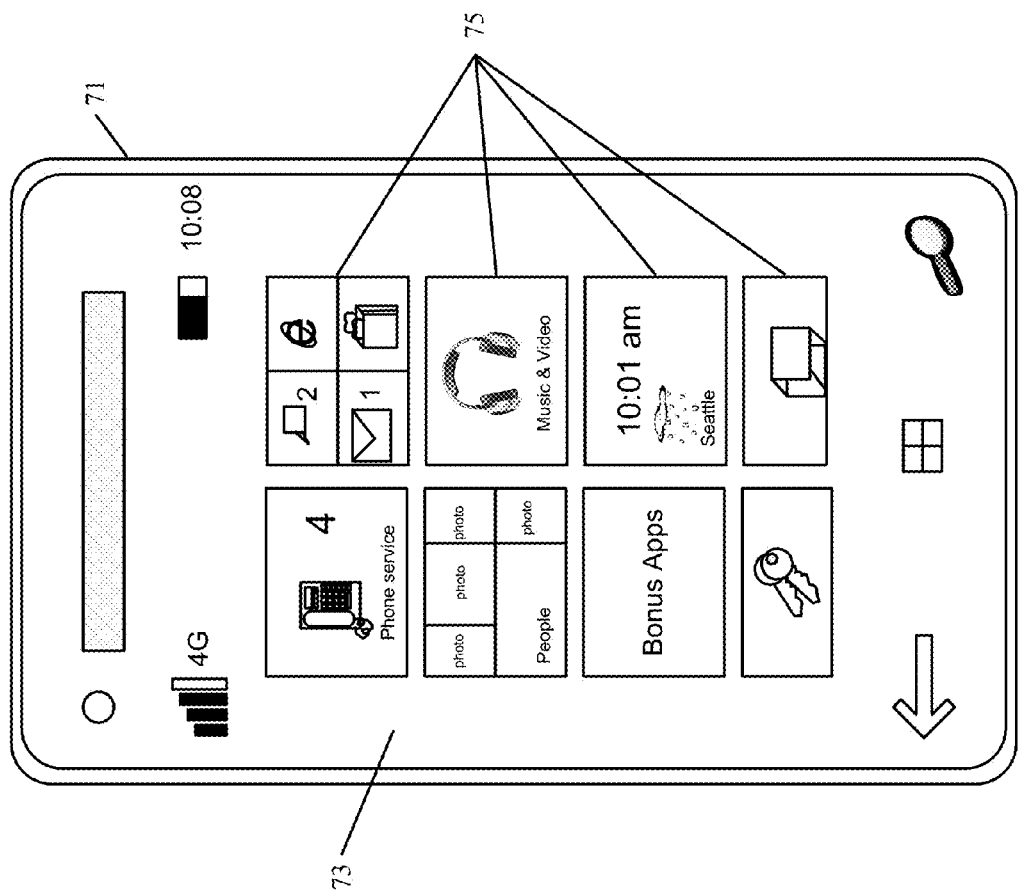

The mobile device of FIG. 7 is a personal digital assistant (PDA) 59 or a multimedia player or a tablet computing device, etc. (hereinafter referred to as PDA 59). PDA 59 includes an inductive (or resistive or capacitive) screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69. FIG. 8 is similar to FIG. 6 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
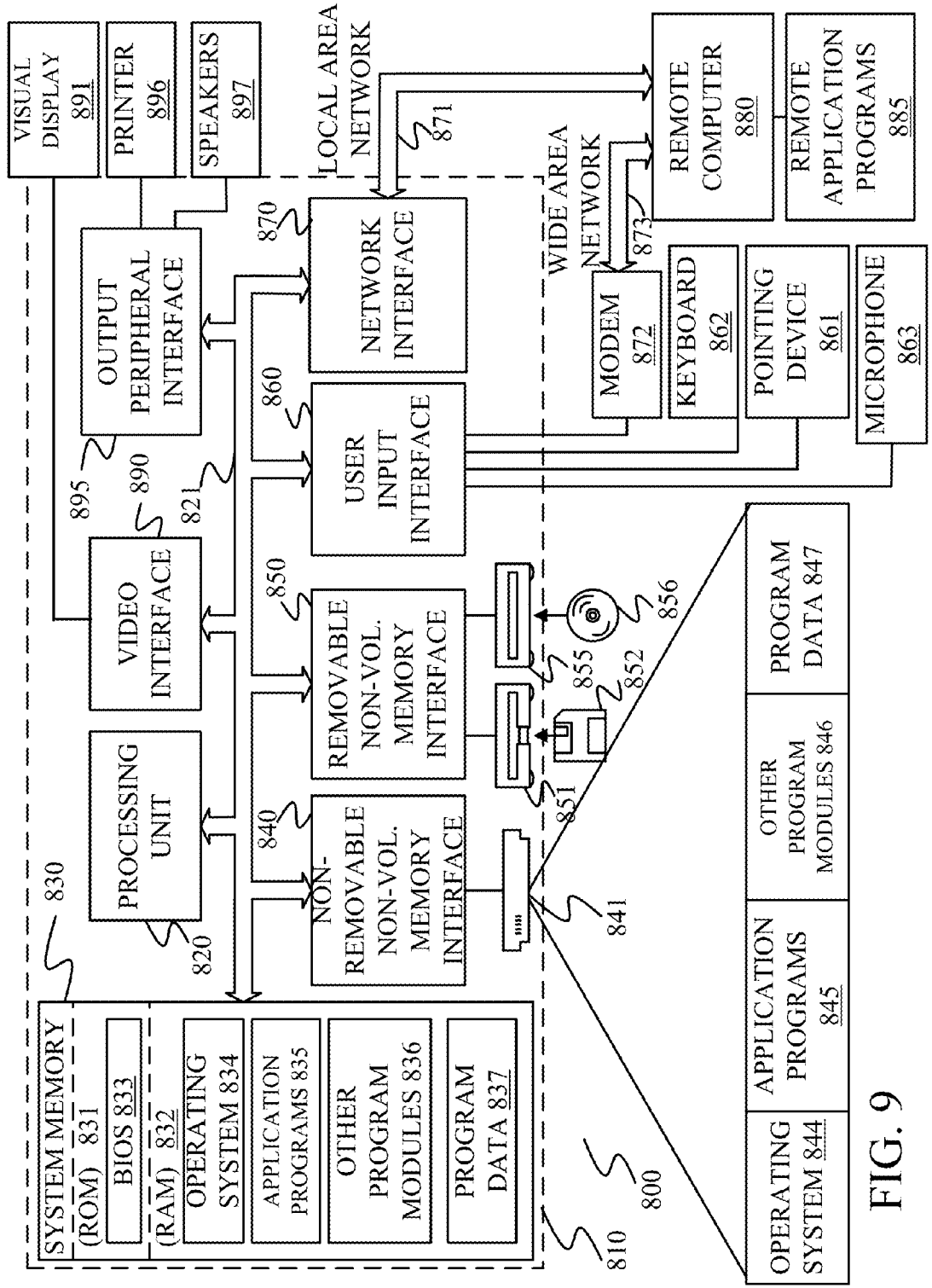
FIG. 9 is a block diagram of one illustrative computing environment.

FIG. 9 is one embodiment of a computing environment in which architecture 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820 (which can comprise one or more processors shown in FIGS. 1 and 2), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) cloud storage, or other optical disk storage, or magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, flash memory cards, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include levers, buttons, switches, a joystick, game pad, satellite dish, scanner, or the like. These and other input devices are often connected to the processing unit 820 through a user input interface 860 that is coupled to the system bus, but may be connected by other interface and bus structures, such as a parallel port, or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
receiving sensor information from a set of sensors;
generating, with a computer processor, a first set of machine monitoring data from the received sensor information;
transmitting the first set of machine monitoring data to a control system of a mobile machine over a first transmission link;
generating a second set of machine monitoring data from the received sensor information;
transmitting the second set of machine monitoring data to a processing system, separate from the control system, over a second transmission link;
determining whether the second transmission link is interrupted; and
if so, storing the second set of machine monitoring data on a data store and resuming transmission of the second set of machine monitoring data over the second transmission link when the second transmission link is reestablished.

2. The computer-implemented method of claim 1 wherein the control system includes a display device in an operator compartment of the mobile machine, and further comprising:
generating an operator display on the display device based on the first set of machine monitoring data.

3. The computer-implemented method of claim 1 wherein receiving sensor information comprises:
receiving sensor signals from a plurality of agricultural sensors that sense parameters of an agricultural machine.

4. The computer-implemented method of claim 1 wherein generating the first set of machine monitoring data and generating the second set of machine monitoring data are performed by a single data processing system.

5. The computer-implemented method of claim 3 wherein generating the second set of machine monitoring data comprises:
generating row-by-row monitoring data indicative of individual row characteristics.

6. The computer-implemented method of claim 3 wherein generating the second set of machine monitoring data comprises:
    generating row-by-row control data to control individual row performance of the agricultural machine.

7. The computer-implemented method of claim 5 wherein the agricultural machine comprises a planter and wherein generating row-by-row monitoring data comprises:
    generating row-by-row seed placement monitoring data indicative of row-by-row seed placement.

8. The computer-implemented method of claim 6 wherein the agricultural machine comprises a planter and wherein generating row-by-row control data comprises:
    generating row-by-row seeding control data to control row-by-row seeding operation of the planter.

9. The computer-implemented method of claim 1 wherein generating the first set of machine monitoring data comprises:
    generating control data, based on the sensor information, that facilitates control of operations of the mobile machine; and
    generating sensor data, at a first resolution, indicative of sensor signal values from the plurality of sensors.

10. The computer-implemented method of claim 9 wherein generating the second set of machine monitoring data comprises:
    generating sensor data at a second resolution, higher than the first resolution, indicative of the sensor signal values from the plurality of sensors.

11. The computer-implemented method of claim 10 wherein generating sensor data at the second resolution comprises:
    generating the sensor data at the second resolution indicative of sensor signal values from more sensors than the sensor signal data generated at the first resolution.

12. The computer-implemented method of claim 10 wherein transmitting the first set of machine monitoring data comprises:
    transmitting the first set of machine monitoring data to the control system over the first transmission link having a first transmission bandwidth.

13. The computer-implemented method of claim 12 wherein transmitting the second set of machine monitoring data to the processing system comprises:
    transmitting the second set of machine monitoring data over the second transmission link having a second transmission bandwidth, the second transmission bandwidth being higher than the first transmission bandwidth.

14. The computer-implemented method of claim 13 and further comprising:
    storing the second set of machine monitoring on a data store, prior to transmitting it over the second transmission link.

15. The computer-implemented method of claim 13 wherein transmitting the second set of machine monitoring data to the processing system comprises:
    transmitting the second set of machine monitoring data to a remote server.

16. The computer-implemented method of claim 13 and, in addition to transmitting the second set of machine monitoring data to the processing system, further comprising:
    transmitting the second set of machine monitoring data to a remote analysis system.

17. The computer-implemented method of claim 15 and further comprising:
    displaying the second set of machine monitoring data on a display at the remote server.

18. The computer-implemented method of claim 1 wherein transmitting the first and second set of machine monitoring data is performed using a single, integrated, system.

19. A data processing system, comprising:
    a plurality of sensors sensing variables on a first mobile machine; and
    a processing system on the first mobile machine that receives sensor information from the plurality of sensors and generates low resolution data indicative of the sensor information and that generates high resolution data, that is higher resolution than the low resolution data, and transmits the low resolution data and the high resolution data to another processing system over a transmission link.

20. The data processing system of claim 19 wherein the processing system comprises:
    a low resolution processing system that generates the low resolution data; and
    a high resolution processing system that generates the high resolution data.

21. The data processing system of claim 19 wherein the transmission link comprises:
    a low resolution transmission link, having a first data transmission bandwidth over which the low resolution data is transmitted; and
    a high resolution transmission link, having a second data transmission bandwidth that is higher than the first data transmission bandwidth, over which the high resolution data is transmitted.

22. The data processing system of claim 19 wherein the processing system transmits the low resolution data to a control system.

23. The data processing system of claim 19 wherein the processing system transmits the high resolution data to a control system.

24. The data processing system of claim 19 and further comprising:
    a high resolution data store on the first mobile machine, the data processing system storing the high resolution data in the high resolution data store.

25. The data processing system of claim 24 wherein the transmission link comprises:
    a controller area network (CAN) bus.

26. The data processing system of claim 24 wherein another processing system comprises:
    a mobile device in an operator's compartment of a second mobile machine coupled to the first mobile machine.

27. The data processing system of claim 24 wherein the data processing system transmits the high resolution data to a remote server.

28. The data processing system of claim 27 wherein the remote server comprises:
    a remote server-based analysis system.

29. A computer-implemented method, comprising:
    receiving sensor signals from a plurality of sensors on a mobile machine;
    generating, with a computer processor, high resolution data on the mobile machine, at a first resolution, from the sensor signals;
    transmitting the high resolution data to a high resolution system using a high bandwidth transmission link that transmits the high resolution data at a first transmission rate;
    generating low resolution data on the mobile machine, at a second resolution that is lower than the first resolution, from the sensor signals; and transmitting the low resolution data to a low resolution system over a low bandwidth transmission link that transmits the low resolution data at a second transmission rate that is lower than the first transmission rate.

30. The computer-implemented method of claim 29 and further comprising:
storing the high resolution data on the mobile machine; and
intermittently transmitting the high resolution data to a remote server.

\* \* \* \* \*